June 21, 1938.   R. J. OLANDER   2,121,095
COMBINED CLUTCH AND FRICTION RETARDING MEANS FOR HAND BRAKES
Filed Feb. 17, 1937
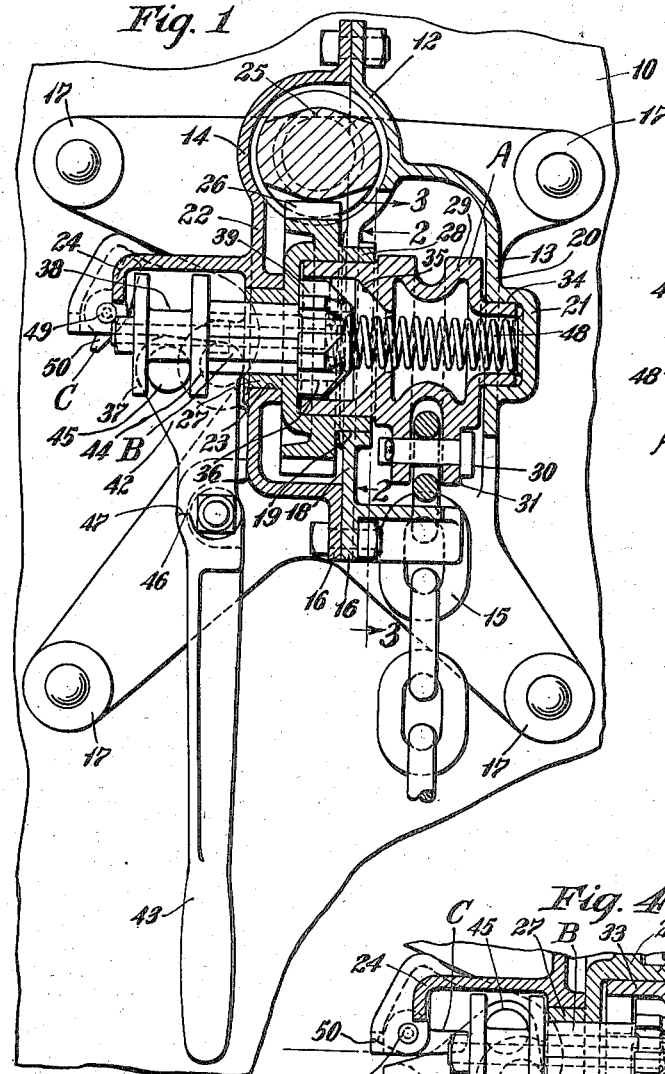
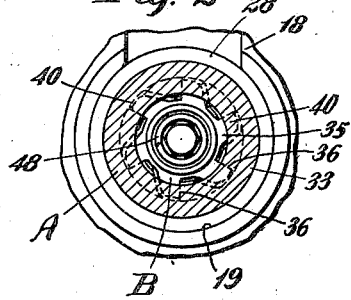
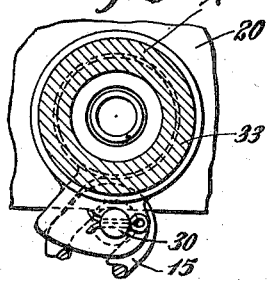
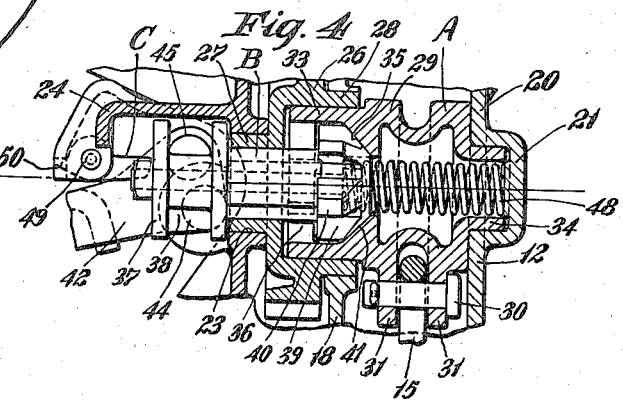
Inventor
Roland J. Olander
By Henry Fuchs
Atty.

Patented June 21, 1938

2,121,095

UNITED STATES PATENT OFFICE 2,121,095

COMBINED CLUTCH AND FRICTION RETARDING MEANS FOR HAND BRAKES

Roland J. Olander, Chicago, Ill., assignor to W. H. Miner, Inc., Chicago, Ill., a corporation of Delaware Application February 17, 1937, Serial No. 126,150

10 Claims. (Cl. 74—505)

This invention relates to improvements in manually actuated brake mechanism for railway cars of the power multiplying type, comprising chain winding means and hand operated, power multiplying, actuating mechanism, wherein the actuating mechanism is operatively connected to the winding means for the brake chain by releasable clutch means to permit quick release of the brakes without spinning of the hand wheel.

One object of the invention is to provide in a manually operated, power multiplying brake mechanism for railway cars having releasable clutch means for effecting quick release of the brakes, means for retarding the unwinding movement of the chain winding means when release of the brakes is initiated.

A more specific object of the invention is to provide friction retarding or snubbing means for the chain drum of a brake mechanism of the character specified wherein the means for retarding the unwinding movement of the drum is rendered effective immediately upon the clutch being released from driving engagement with the drum to produce a snubbing action during the initial releasing action of the brakes.

A further object of the invention is to provide a brake mechanism comprising a rotary chain winding drum, rotary actuating means therefor, and a releasable clutch member operatively connecting the drum to the rotary actuating means, wherein the clutch member, when released to permit rotation of the drum with respect to the rotary actuating means, has frictional engagement with the drum to retard unwinding movement of the latter.

A still further object of the invention is to provide in a mechanism of the character specified in the preceding paragraph a safety device in the form of automatically operated latch means for preventing accidental reengagement of the clutch means during release of the brakes.

Other objects of the invention will more clearly appear from the description and claims hereinafter following.

In the drawing forming a part of this specification, Figure 1 is a vertical, sectional view of a power multiplying brake mechanism, illustrating my improvements in connection therewith, the brake mechanism being illustrated as mounted on the end wall of a car, said wall being broken away and the section through the brake mechanism being in a plane parallel to said end wall. Figures 2 and 3 are vertical, sectional views, corresponding respectively to the lines 2—2 and 3—3 of Figure 1, said views being broken away. Figure 4 is a broken view, similar to Figure 1, but showing the parts in different positions.

In said drawing 10 indicates the vertical end wall of a railway car on which is mounted the hand operated, power multiplying brake mechanism. In the present instance, my improvements are shown as embodied in a power multiplying brake mechanism of the worm gear type, similar to the mechanism disclosed in Patent No. 1,974,581, granted to me, September 25, 1934, and operating in a like manner.

My improved mechanism comprises broadly a chain winding drum A; a combined sliding clutch and retarding element B releasably connecting the chain winding drum to the rotary actuating means of the brake mechanism and adapted to have frictional engagement with the drum to retard movement of the latter during release of the brakes; and a latch member C cooperating with the combined clutch and retarding element B.

In the embodiment of the invention as herein disclosed, I provide a housing 12 for the operating parts of the brake mechanism. The housing 12 is vertically divided into two hollow sections 13 and 14. Each section is preferably in the form of a casting. The housing section 13, as clearly shown in Figure 1, is open at the bottom to freely accommodate the brake chain 15 which is connected to the brake mechanism proper of the car in the usual well known manner, the opening being of such a size as to permit the required upward and downward movement of the chain without interference, as the hand brakes are operated. At their meeting edges, the housing sections 13 and 14 have flanges 16 which are bolted together to secure the sections to each other and hold the same assembled.

Section 13 is also provided with ears 17—17 by which the housing is fixed to the end wall of the car. The housing 12 is further provided with a vertical partition wall 18 dividing the same into two compartments. This wall is in a plane at right angles to the car wall 10 and is formed integral with the section 13. The wall 18 is provided with a bearing seat 19 for a purpose hereinafter pointed out. At the right hand end, as viewed in Figure 1, the housing section 13 has a vertical side wall 20 parallel to the partition wall 18 and said wall 20 is formed with a hollow, outwardly projecting, cylindrical boss 21 forming a bearing seat coaxial with the bearing seat 19. The housing section 14 has a side wall 22 parallel to the partition wall 18, and said wall 22 is provided with a cylindrical opening 23 coaxial with the bearing seats 19 and 21. The housing section 14 is further provided with an extension 24 at the left hand side thereof, as viewed in Figure 1, said extension being in alignment with the bearing opening 23. The extension 24 is formed integral with the section 14 of the housing and is in the form of a hoodlike member which is open at the bottom. The top portions of the sections 13 and 14 of the housing 12 are formed to provide a substantially cylindrical chamber which accommodates the worm member 25 of the power multiplying mechanism of the brakes, said chamber communicating at the bottom with the interior of the main body portion of the housing.

The chain winding drum A, which is in the form of a hollow casting, is mounted within the chamber provided by the housing section 13 and is operatively connected to a worm wheel 26 in the chamber of the section 14 of the housing by means of the combined clutch and retarding element B. The worm wheel 26 meshes with the worm 25 and is driven by the latter, the construction and operation of these parts being similar to the corresponding parts of the worm gear brake mechanism disclosed in Patent No. 1,974,581, hereinbefore referred to, the worm 25 being manually rotated by a hand wheel (not shown) exterior to the housing. The worm wheel 26 is hollow and is provided with hollow, cylindrical hub portions 27 and 28 projecting from opposite sides thereof, the hub portion 27 which is at the left hand side thereof, as viewed in Figure 1, being of lesser diameter than the hub portion 28. The hub portions 27 and 28 are respectively journaled in the bearing opening 23 and the seat 19 of the partition wall 18.

The chain winding drum A has an enlarged, substantially central, chain winding portion 29, which is circumferentially grooved to accommodate the sides of the links of the chain 15. The chain 15 is anchored to the drum to be wound thereon in the usual manner when the brakes are being applied, the inner end link of the chain 15 being fixed to the drum by a pin 30 extending through said end link and spaced lugs 31—31 on the drum A. The drum A has hollow, cylindrical, bearing projections 33 and 34 at opposite sides thereof, the bearing projection 33 being of larger diameter than the projection 34. The drum is rotatably supported by the bearing projections 33 and 34, said projections being journaled respectively within the hollow hub 28 of the worm wheel 26 and the bearing seat provided by the boss 21 on the wall 20 of the housing. The hollow, cylindrical bearing portion 33 of the drum is of relatively great length and is telescoped within the hollow hub portion 28 of the worm wheel 26 and extends into the hollow central portion of the worm wheel, as clearly shown in Figure 1. At the inner end the opening of the projecting portion 33 of the drum is contracted, as shown clearly in Figures 1 and 4, said contracted portion being of conical, interior contour and presenting a seat 35 providing a friction surface or face for a purpose hereinafter pointed out. At the outer end thereof, the projection 33 of the drum is provided with interior clutch projections or teeth 36 adapted to cooperate with the combined clutch and retarding element B.

The combined sliding clutch and retarding element B is mounted in the hub 27 of the worm wheel 26 so as to have axial sliding movement, and extends into the hoodlike extension 24 of the housing section 14, as clearly shown in Figure 1. This extension of the clutch element B is provided with a spoollike section 37 at the outer end thereof having an annular groove 38 adapted to cooperate with means for shifting the clutch element. The element B is splined to the hub 27 of the worm wheel 26, thus being rotatable with the latter but capable of having lengthwise sliding movement with respect thereto. At the right hand end, as viewed in Figure 1, the element B is provided with an enlarged head 39 having an annular series of clutch projections or teeth 40—40 thereon engageable with the clutch projections 36—36 of the drum A. The inner or right hand end portion of the head 39 is of conical shape, as indicated at 41, to correspond with the conical opening or seat 35 of the drum A and adapted to have frictional engagement with the friction face of the latter to retard rotary movement of the drum when the element B is moved to engage the conical portion thereof within said seat. As shown most clearly in Figure 1, the conical portion of the head 39 includes the projections or teeth 40—40 of the latter, thus providing a friction area of maximum size. The parts of the clutch head 39 and the cooperating portions of the drum A are so proportioned and designed that the clutch projections of the head 39 are completely disengaged from the cooperating projections of the drum A when the cone 41 is in retarding frictional contact with the conical seat 35 of the drum A, but that the clearance between the clutch projections of the drum and the head of the clutch is relatively slight when the clutch element is in disengaged position and in frictional contact with the conical seat of the drum, whereby substantially instantaneous retarding action is assured when the clutch element is released.

Shifting means for the clutch element B, in the form of a lever member having a forked head 42 and an operating handle 43 pivoted to the head, is provided, the head 42 being pivoted on the hood 24, as indicated at 44, and having trunnion means 45 eccentric to said pivotal connection 44, engaged in the groove 38 of the spool 37 of the clutch element B. Inasmuch as the handle 43 is pivoted to the forked head 42, it will at all times assume a pendant position through the action of gravity thereon, when released by the operator. In order to effect swinging movement of the head 42 to move the clutch element B to the right when the handle 43 is swung toward the left, as viewed in Figure 1, the pivoted connecting portion of the handle is provided with a shoulder 46 engageable with a cooperating shoulder 47 on the head 42. As will be evident, the combined weight of the head 42 and the handle 43 holds the clutch element B in engagement with the clutch projections of the drum and tends to return said clutch element to such engaged position after the same has been manually released by the operation of the handle lever 43. To assist in holding the clutch element B engaged and moving the same to said engaged position, a coil spring 48 is provided which acts directly on the clutch element and is interposed between the right hand end of the latter and the vertical wall of the boss 21 on the housing 20.

The latch member C is in the form of a pivoted arm or finger housed within the hood 24, and swingingly supported at the left hand end of the latter, as viewed in Figure 1, by means of a pivot 49. The latch member has the main body portion thereof disposed above the pivot 49, this portion being relatively thick and heavy so that the latch will drop by the action of gravity. Below the pivot thereof, the latch has a tail piece 50 which engages underneath the shoulder on the outer end wall of the hood 24, as shown in Figure 3, to limit the downward swinging movement of the latch member. This latch member is of substantially the same design and construction as the latch member C described in Patent No. 1,974,581 hereinbefore mentioned, and operates in a similar manner. This latch is disposed to one side of the axis of rotation of the clutch element B so that the inner edge of the long arm of said latch member will engage the face of the outer flange of the spool 37 of the element B at a point to one side of the axis of rotation of said spool and slightly above said axis to hold said element B in the position shown in Figure 4. As shown in said last named figure, the latch C contacts the spool 37 in back of the axis of rotation of the latter so that when the spool is rotated in a clockwise direction looking from right to left in Figures 1 to 4, which is the direction of rotation thereof when the brakes are being tightened or applied, the latch C will be thrown upwardly due to the friction between the spool and the engaging end of the latch. When the latch C has been lifted a short distance, further upward swinging movement thereof is insured by movement of the element B to the left, as viewed in Figures 1 and 4, the element B being urged to the left by the combined action of the spring 48 and the gravity influenced lever 43. In Figure 4, the clutch element B is shown as completely disengaged. When in this last named position, the projections of the clutch head of the element B are completely disengaged from the clutch projections of the drum A, and the latch C locks the element B in that position until the latch is unlocked by rotation in brake tightening direction of the spool 37 of the element B. In order to facilitate the upward swinging movement of the latch C, the bottom corner of the contacting portion of the long arm thereof is rounded off, as most clearly shown in Figure 4.

With the brake mechanism in the position shown in Figure 1, the operation in applying the brakes is as follows: The worm 25 is rotated in a clockwise direction, as viewed in Figure 1, through rotation of the usual hand wheel which is connected thereto, thereby imparting a clockwise rotation to the worm wheel, said last named direction of rotation being considered looking from left to right in said Figure 1. Inasmuch as the clutch element B is rotatable in unison with the worm wheel 26 and is in operative clutching engagement with the drum A, the latter will be driven in the same direction as the worm wheel and the chain 15 wound on said drum, thereby operating the brake mechanism proper of the car to apply the brakes. Due to the existing friction between the worm and the worm wheel, the brakes will remain set until manually released by the backing off of the brake mechanism through rotation of the parts in brake releasing direction or by disengagement of the clutch element B from the drum A. Quick release of the brakes is effected by disengagement of the clutch element B. In order to effect such quick release, the clutch element B is shifted from the position shown in Figure 1 to the position shown in Figure 4 by pulling the shifting lever handle 43 outwardly and upwardly. Immediately upon disengagement of the clutch element B, the conical friction surface of the same is brought into engagement with the conical seat of the drum A, thereby retarding or snubbing the rotary unwinding movement of the drum, which drum is otherwise completely free to rotate when the clutch has been disengaged. The thrust exerted on the drum forces the end of the same against the wall 20 of the housing, thereby providing further frictional resistance against rotation. At the same time that the clutch element B is disengaged from the cooperating clutch projections of the drum A, the latch C will automatically drop to the locking position shown in Figure 4, thereby positively holding the clutch element disengaged until the brake mechanism is again operated to apply the brakes. The latch element C thus serves to prevent accidental reengagement of the clutch element B with the clutch projections of the drum prior to complete release of the brakes by unwinding of the chain 15 from the drum, which reengagement might otherwise occur due to the slowing up or snubbing action exerted on the drum by the retarding means.

Assuming that the brakes have been completely released, the parts will remain in the position shown in Figure 4 until the power multiplying worm gearing is again rotated in the direction to apply the brakes, whereupon the latch C is automatically thrown out of locking position through rotation of the clutch element B, as hereinbefore described, thereby freeing the clutch element B for movement in an axial direction and permitting reengagement of the same with the clutch projection of the drum A due to the action of gravity on the shifting lever 43 and the assisting action of the spring 48. The parts thus assume the position shown in Figure 1 and the brakes may again be fully applied as hereinbefore described.

In order to effect partial or complete relatively slow backing off of the brake mechanism, it is merely necessary to rotate the hand wheel in a direction reverse to the direction of rotation thereof when applying the brakes, while leaving the clutch element B engaged with the cooperating clutch portion of the drum A.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding member; of a rotary worm; a worm wheel in mesh with said worm; a sliding clutch element operatively connecting said worm wheel and winding member, said clutch element being rotatable in unison with said worm wheel; means for actuating said clutch element to engage the same with and disengage the same from said winding member; and means on said clutch element for retarding rotary movement of said winding member when said clutch element is disengaged.

2. In a hand brake mechanism, the combination with a rotary chain winding member; of a driving worm; a worm wheel in mesh with and driven by said worm; clutch means for operatively connecting said worm wheel and winding member, said clutch means being rotatable in unison with said worm wheel; means for actuating said clutch means to either operatively connect the same with or disconnect the same from the winding member; and means on said clutch means rendered operative by disengaging movement of said clutch means for retarding rotation of said winding member.

3. In a hand brake mechanism, the combination with a rotary chain winding member; of intermeshing worm and worm wheel elements; a sliding clutch element connected to said worm wheel for rotation in unison therewith, said clutch element and winding member having cooperating clutch projections thereon; means for actuating said clutch element to either disengage the clutch projections thereof from the projections of said winding member or engaging the same therewith; and fixed friction means on said clutch element engageable with said winding member to retard movement of the latter when said clutch element is disengaged from the winding element.

4. In a hand brake mechanism, the combination with a rotary winding member having clutch means thereon; of worm gearing including a worm wheel; a clutch element rotatable in unison with said worm wheel and slidable with respect thereto to operatively engage said clutch means of the winding member; means for sliding said clutch element; and friction means on said clutch element engageable with said winding member for retarding rotation of the latter when said clutch element is disengaged from said clutch means.

5. In a hand brake mechanism, the combination with a rotary winding member; of a rotary worm wheel member; a rotary worm in meshing driving engagement with said worm wheel member; a sliding element connected to one of said members for rotation therewith; cooperating interengaging clutch means on said sliding element and the other member; means for actuating said sliding element to disengage the same from the clutch means of said member provided with the clutch means; and friction grip means on said sliding element engageable with said member provided with the clutch means to retard rotation of the latter when said clutch means of said element is disengaged from the operating clutch means.

6. In a hand brake mechanism, the combination with a rotary winding member having clutch means thereon; of a rotary driving member; a clutch element rotatable in unison with said driving member and slidable with respect thereto to operatively engage said clutch means of the winding member; means for sliding said clutch element; friction means on said clutch element engageable with said winding member for retarding rotation of the latter when said clutch element is disengaged from said clutch means; and automatically operated latch means for holding said element in disengaged position until the brake mechanism is operated to tighten the brakes.

7. In a hand brake mechanism, the combination with a rotary winding member; of a rotary driving member; a sliding element connected to said driving member for rotation therewith; cooperating interengaging clutch means on said sliding element and winding member; means for actuating said sliding element to disengage the same from the clutch means of said winding member; friction means on said sliding element engageable with said winding member to retard rotation of the latter when said clutch means of said element is disengaged from the clutch means of said winding member; and automatically operated latch means for holding said sliding element out of clutching engagement until the brake mechanism is operated in brake tightening direction.

8. In a hand brake mechanism, the combination with a rotary winding member; of a rotary driving member coaxial with said winding member; a sliding element locked to said driving member for rotation therewith; cooperating interengaging clutch means on said drum and sliding element; cooperating friction means on said element and drum; means for actuating said sliding element to either engage said cooperating clutch means and disengage the cooperating friction means or to simultaneously disengage said cooperating clutch means and engage said cooperating friction means to retard rotation of said winding member; and latch means automatically movable to latching position for holding said sliding element out of clutching engagement upon movement of said element to said disengaged position, said latch means being automatically moved out of latching position by operation of the brake mechanism in a direction to apply the brakes.

9. In a hand brake mechanism, the combination with a winding drum; of a rotary worm actuated driving member coaxial with said drum; a sliding clutch element coaxial with said driving member and having a splined connection therewith; means for actuating said element; cooperating interengageable clutch means on said element and winding drum; and cooperating friction faces on said sliding element and drum engageable with each other when said cooperating clutch means is disengaged.

10. In a mechanism of the character described, the combination with a rotary driving member and a rotary driven member coaxial with each other; of clutch projections on said driven member; a conical seat on said driven member coaxial with the axis of rotation of said member; a sliding clutch element coaxial with said members and having splined connection with said rotary driving member; a clutch head on said sliding element having clutch projections engageable with the clutch projections of said driven member, said head having a conical friction section engageable with said seat to retard rotation of said driven member with respect to said driving member when the sliding element is moved to a position to disengage said clutch projections from each other; and means for shifting said sliding clutch element.

ROLAND J. OLANDER.